J. L. CREVELING.
ELECTRIC REGULATION.
APPLICATION FILED OCT. 11, 1910.
1,020,479.
Patented Mar. 19, 1912.
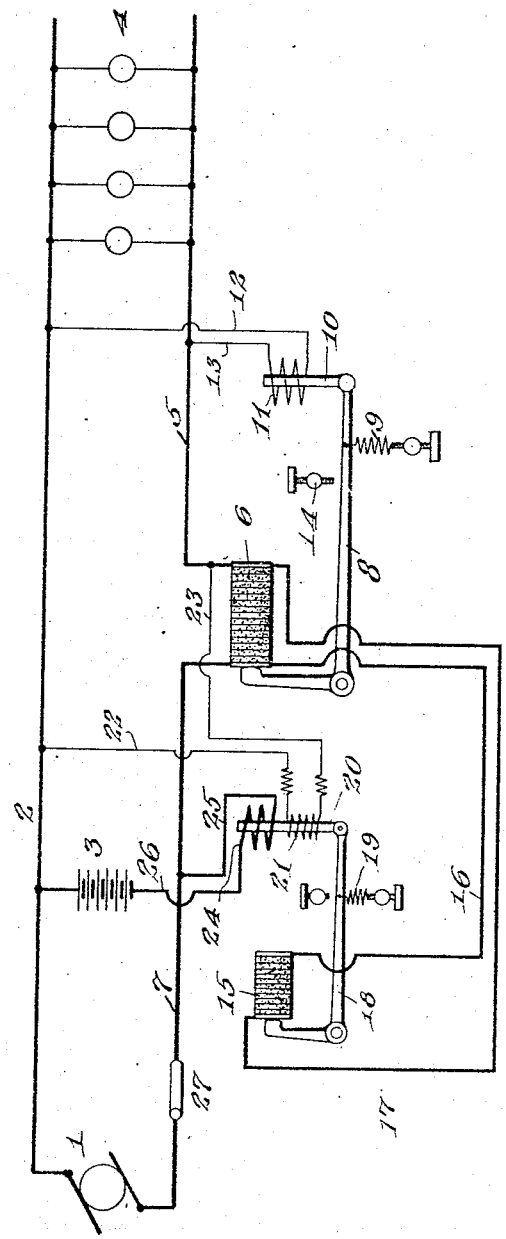
WITNESSES
A. E. Lucas
M. Hershovitz
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,020,479.  Specification of Letters Patent.  Patented Mar. 19, 1912.

Application filed October 11, 1910. Serial No. 586,482.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to govern or control the current in a circuit or the voltage across a circuit in a predetermined manner.

My invention has for its particular object to provide means whereby these functions may be automatically performed.

As my invention is particularly applicable to a system employing a generator to charge a storage battery and operate lamps or other translating devices, it will be described with reference to such a system.

The drawing is a diagrammatic representation of one type of such a system comprehending my invention.

In the drawing 1 represents a dynamo or generator the positive brush of which, is connected with the lead 2 communicating with the storage battery 3 and one side of the lamps or translating devices 4. The opposite side of the translating devices is connected with the main 5 which is carried to one side of the resistance 6, in this instance indicated as a carbon pile. The other side of the said carbon pile is connected as by lead 7 with the generator 1. The carbon pile 6 has connected therewith the lever 8 normally drawn downwardly as by adjustable spring 9 in such manner as to tend to compress the said pile and lower the resistance thereof. The lever 8 is provided with a core 10 of iron or other magnetic material surrounded by the solenoid 11 in shunt across the translation circuit as by means of wires 12 and 13. Current flowing in the coil 11 tends to attract the plunger 10 so as to raise the lever 8 and decrease the pressure upon the carbon pile 6.

14 is an adjustable stop for limiting the motion that may be given to the lever 8 by the solenoid 11.

15 is a carbon pile in shunt across the carbon pile 6 as by wires 16 and 17.

18 is a lever normally drawn in a downward direction by the adjustable spring 19 such manner as to compress the carbon pile 15 and reduce the resistance thereof. The lever 18 is provided at its extremity with the core 20 of iron or other magnetic material having wound thereupon a helix or winding 21 flexibly connected as by wires 22 and 23 across the translation circuit.

24 is a solenoid connected as by wire 25 with the lead 7 and with the negative side of the storage battery 3 as by wire 26. The helix 24 is so arranged as to tend to attract and lift the core 20 when current flows from the generator to the storage battery through the coil 24 and to repel the core 20 when current flows from the storage battery to line through the coil 24, the core 20 being excited in a uniform direction by winding 21.

27 represents a switch by which the dynamo circuit may be broken when the electro-motive force of the generator is below that of the battery.

The operation of my invention is substantially as follows:—If the generator be still or running at low speed so that its electromotive force is below that of the battery or for any other reason the switch 27 be open, any load upon the translation circuit, as, for example, the devices 4 will be supplied by the battery and the current will flow from the battery through lead 2, translation devices 4, main 5 to one end of the carbon pile 6 where it will branch, part thereof going through the said carbon pile to the main 7 and part through wire 17, carbon pile 15 and wire 16 to the lead 7 where return is made to the battery 3 through wire 25, solenoid 24 and wire 26. Current returning to the battery through solenoid 24 will cause the same to set up a magneto-motive force opposed to that set up in coil 21 and, therefore, the core 20 will be repelled downwardly which action will assist the spring 19 in compacting the carbons 15 and reducing the resistance thereof. If now the generator voltage be brought up so that the same is above that of the storage battery and the switch 27 be closed, current will flow from the generator through the lead 2 to the battery and translating devices. That portion passing through the storage battery will traverse the windings 24 in a reverse direction to that when the battery was supplying current and tend to attract the core 20 and decrease the pressure upon the carbon pile 15. That portion of the current supplied to the lamps or translating devices will return to the lead 7 in the same manner as described above and thence to the generator instead of to the battery as mentioned in the description when the battery was supplying current and as the voltage rises across the generator circuit in order to force the charging current through the battery, the voltage will tend to rise across the translation circuit but will be held practically constant by coil 11 causing resistance 6 to be increased. Also as the charging current into the battery rises the resistance 15 will be increased so as to cause more of the load on the translation circuit to pass through the regulating resistance 6.

I do not wish in any way to limit myself to the exact details of construction and mode of operation set forth in this specification and drawing, inasmuch as I have shown a mere diagrammatic representation of one type of system embodying my invention, and it will be obvious that wide departure in details may be made without departing from the scope of my invention as set forth in the following claims:—

1. In a system of electrical distribution comprehending a dynamo and storage battery, means for controlling an electric circuit comprehending a circuit controlling element, means for operating the same, circuit controlling means coöperating with the circuit controlling element in the control of said circuit and means for controlling said last mentioned means dependent upon the current to and from the storage battery.

2. In a system of electrical distribution comprehending a generator, a storage battery and a translation circuit, means for governing the translation circuit comprehending circuit controlling means, means for operating the same responsive to fluctuations in the translation circuit, circuit controlling means coöperating with the first-mentioned circuit controlling means to regulate the translation circuit and means for controlling the same responsive to current changes in the battery circuit.

3. In a system of electrical distribution comprehending a generator, a storage battery and a translation circuit, means for governing the translation circuit comprehending a circuit controlling means affecting the translation circuit, means for operating the same responsive to fluctuations in the translation circuit, circuit controlling means affecting the translation circuit coöperating with the first-mentioned circuit controlling means in the regulation of the translation circuit and means for controlling the same responsive to changes in current and polarity in the battery circuit.

4. In a system of electrical distribution comprehending a generator, a storage battery and a translation circuit, means for controlling the translation circuit, comprehending controlling means responsive to fluctuations in the said translation circuit and controlling means coöperative therewith to control said circuit responsive to changes in the battery circuit.

5. In a system of electrical distribution comprehending a generator, a storage battery and a translation circuit, means for controlling the translation circuit, comprehending controlling means responsive to fluctuations in the said translation circuit and controlling means coöperating therewith to control said circuit responsive to changes in current in the battery circuit.

6. In a system of electrical distribution comprehending a generator, a storage battery and a translation circuit, means for controlling the translation circuit comprehending voltage regulating means responsive to fluctuations in the said translation circuit and voltage regulating means coöperating therewith to regulate said circuit responsive to changes of polarity in the battery circuit.

7. In a system of electrical distribution comprehending a generator, a storage battery and a translation circuit, means for controlling the translation circuit comprehending voltage regulating means responsive to fluctuations in the said translation circuit and voltage regulating means coöperating therewith to regulate said circuit responsive to changes in current and polarity in the battery circuit.

8. In a system of electrical distribution comprehending a generator, storage battery and a translation circuit, means for controlling the translation circuit comprehending controlling means responsive to fluctuations in said translation circuit, means coöperating therewith comprehending a variable resistance in shunt thereto, and means for controlling the same dependent upon the current flowing to and from the storage battery.

9. In a system of electrical distribution comprehending a generator, a storage battery and a translation circuit, means for controlling a translation circuit comprehending a resistance element in said circuit and means for operating the same responsive to fluctuations in said translation circuit, means coöperating therewith to control the translation circuit controlled by the joint effect of current derived from the translating circuit and the current in the battery circuit.

10. In a system of electrical distribution comprehending a generator, a storage battery and a translation circuit, means for controlling the translation circuit compr hending a controlling element in said c: cuit, a coil for controlling the same respc sive to fluctuations in said circuit, a sistance element in shunt to the first-nan controlling element and means for controlling the same comprising a coil in series with the battery.

11. In a system of electrical distribution comprehending a generator, a storage battery and a translation circuit, means for controlling the translation circuit comprehending a controlling element in said circuit, a coil for controlling the same responsive to fluctuations in said circuit, a resistance element in shunt to the first-named controlling element and means for controlling the same comprising a coil in shunt to the battery.

12. In a system of electrical distribution comprehending a generator, a storage battery and a translation circuit, means for controlling the translation circuit comprehending a controlling element in said circuit, a coil for controlling the same responsive to fluctuations in said circuit, a resistance element in shunt to the first-named controlling element and means for controlling the same comprising a coil in shunt to the translation circuit.

13. In a system of electrical distribution comprehending a generator, a storage battery and a translation circuit, means for regulating the translation circuit comprehending regulating means responsive to fluctuations in said translation circuit, means coöperating therewith in the regulation of said circuit comprising regulating means for varying the effect upon the translation circuit produced by given changes in the first named regulating means and means for operating the second named regulating means affected by current to and from the storage battery.

JOHN L. CREVELING.

Witnesses:
CHAS. McC. CHAPMAN,
A. E. TUERS.